(12) United States Patent
Di Censo et al.

(10) Patent No.: US 10,225,510 B2
(45) Date of Patent: Mar. 5, 2019

(54) PROVIDING A LOG OF EVENTS TO AN ISOLATED USER

(71) Applicant: HARMAN INTERNATIONAL INDUSTRIES, INCORPORATED, Stamford, CT (US)

(72) Inventors: Davide Di Censo, San Mateo, CA (US); Stefan Marti, Oakland, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 15/846,066

(22) Filed: Dec. 18, 2017

(65) Prior Publication Data

US 2018/0109753 A1  Apr. 19, 2018

Related U.S. Application Data

(62) Division of application No. 14/476,110, filed on Sep. 3, 2014, now Pat. No. 9,876,985.

(51) Int. Cl.
```
H04R 29/00    (2006.01)
H04N 5/765    (2006.01)
H04N 5/91     (2006.01)
H04R 1/10     (2006.01)
G06F 3/00     (2006.01)
```

(52) U.S. Cl.
CPC ............ *H04N 5/765* (2013.01); *G06F 3/005* (2013.01); *H04N 5/91* (2013.01); *H04R 1/1091* (2013.01); *H04R 1/1008* (2013.01); *H04R 1/1041* (2013.01); *H04R 29/00* (2013.01); *H04R 2460/01* (2013.01)

(58) Field of Classification Search
CPC .......... H04N 5/765; H04N 5/91; G06F 3/005; H04R 1/1091; H04R 1/1008; H04R 1/1041; H04R 29/00; H04R 2460/01
See application file for complete search history.

(56) References Cited

U.S. PATENT DOCUMENTS

| | | |
|---|---|---|
| 5,241,649 A | 8/1993 | Niyada |
| 7,145,457 B2 | 12/2006 | Spitz et al. |
| 8,031,891 B2 | 10/2011 | Ball et al. |
| 8,762,143 B2 | 6/2014 | Gilbert |

(Continued)

OTHER PUBLICATIONS

Mehrabian, Albert, "Communication Without Words", psychology today reprint series, Sep. 1968, No. P-89, pp. 53-55.

(Continued)

*Primary Examiner* — Andrew L Sniezek
(74) *Attorney, Agent, or Firm* — Artegis Law Group, LLP

(57) ABSTRACT

A system, apparatus, and computer program product for monitoring a subject person's environment while the person is isolated from the environment. The system can use a microphone and/or a digital camera or imager to detect and capture sounds, voices, object, symbols, and faces in the subject person's environment, for example. The captured items can be analyzed, identified, and provided in an events log. The subject person can later review the events log to understand what happened while isolated. In various instances, the subject person can select an event from the log and review the underlying detected sounds, voices, object, symbols, and faces.

16 Claims, 5 Drawing Sheets

(56) References Cited

U.S. PATENT DOCUMENTS

| | | |
|---|---|---|
| 2005/0207543 A1 | 9/2005 | Takeda et al. |
| 2009/0122144 A1 | 5/2009 | Latham et al. |
| 2013/0271559 A1 | 10/2013 | Feng et al. |
| 2013/0288753 A1 | 10/2013 | Jacobsen et al. |
| 2014/0240524 A1* | 8/2014 | Julia .................. G08B 13/196 348/207.1 |
| 2014/0362201 A1 | 12/2014 | Nguyen et al. |
| 2015/0081706 A1 | 3/2015 | Elmqvist Wulcan et al. |
| 2015/0119031 A1* | 4/2015 | Brownworth ....... H04W 60/005 455/435.1 |
| 2016/0034751 A1 | 2/2016 | Brewer et al. |

OTHER PUBLICATIONS

Dai et al., "Recognizing Emotion in Speech Using Neural Networks", Proceedings of the IASTED International Conference on Telehealth/Assistive Technologies, Apr. 16, 2008, pp. 31-36.

Sobol-Shikler, Tal, "Analysis of Affective Expression in Speech", Technical Report, University of Cambridge Computer Laboratory, Jan. 2009, No. 740, pp. 1-163.

Steidl, Stefan, "Vocal Emotion Recognition: State-of-the-Art in Classification of Real-Life Emotions", International Computer Science Institute(ICSI), Oct. 26, 2010, pp. 1-49.

Thompson et al., "Decoding Speech Prosody in Five Languages", Semiotica 158-1/4(2006), pp. 407-424.

* cited by examiner

PROVIDING A LOG OF EVENTS TO AN ISOLATED USER

CROSS-REFERENCE TO RELATED APPLICATIONS

This application is a divisional of the co-pending U.S. patent application titled, "PROVIDING A LOG OF EVENTS TO AN ISOLATED USER," filed on Sep. 3, 2014 and having Ser. No. 14/476,110. The subject matter of this related application is hereby incorporated herein by reference.

BACKGROUND

People often wear noise-canceling or noise-attenuating headphones in busy and/or noisy environments such as offices, coffee shops, and libraries to block out distractions while they work or study. The headphones can be, for example, in-ear headphones (e.g., ear buds), on-ear headphones, or over-the-ear head phones. In many instances, the headphones provide a certain degree of passive noise attenuation by covering the wearer's ear canal. In addition, some headphones can provide active noise canceling by generating sound waves that are opposite to detected sound waves impinging on the headphones.

In some circumstances, noise attenuation and/or noise-canceling can be provided by items other than headphones. For example, some people have private office spaces and can close a door to block or attenuate outside noises. While noise-canceling or noise-attenuating devices, such as those described above, may enable the user to enjoy a distraction-free environment, the user may miss out on events around him while using such a device.

SUMMARY

Embodiments described herein can monitor and capture and/or record the environment around a user of a noise-canceling or noise-attenuating device and create a log of events that happen while the user is using the device. The user can review the log at a later time to get a synopsis of events that happened while the user was using the noise-canceling or noise-attenuating device and, if desired, replay the recording of events corresponding to entries in the log.

In various embodiments, a system can include a first sensor configured to receive an indication that a subject user is isolated from his surroundings. A second sensor can detect physical data relating to the user's surrounds, such as sounds, spoken words, faces, objects, and images. A processor can analyze the detected data to identify one or more events that occurred while the user was isolated. The processor can store the one or more events in an event log. The user can review the event log and select events in the log to review the underlying detected data.

In various embodiments, audio headphones can include acoustic transducers (e.g., speakers) that provide noise-cancelling or noise-attenuation for a user. The headphones can also include a housing. A first sensor, a second sensor, a memory module, and a processor can be arranged in or on the housing. The first sensor can detect when the user is wearing the headphones. The second sensor can detect physical data related to the surroundings, such as sounds, spoken words, faces, objects, and images. The detected physical data can be stored in a memory module. The processor can analyze the detected data to identify one or more events that occurred while the user was wearing the headphones. The processor can store the one or more events in an event log in the memory module. The user can review the event log and select events in the log to review the underlying detected data.

In various embodiments, a computer program product can include a computer-readable storage medium having computer-readable program code configured to receive an indication of activity in an environment of an isolated subject user. The indication of activity can be sounds, spoken words, faces, objects, and images, for example. The program code is also configured to record the indication of activity and analyze the recorded activity to identify one or more events that occurred while the user was isolated. The program code is also configured to store the one or more events in an event log and communicate the event log to the user.

Figure 1:
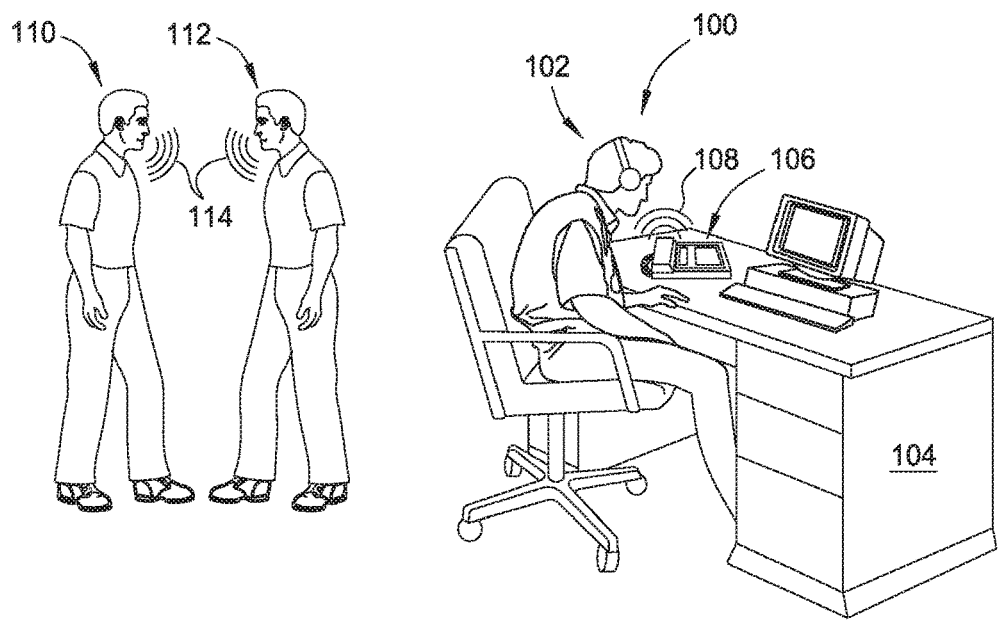
FIG. 1 illustrates an environment in which a user is wearing an embodiment of a pair of headphones, wherein the headphones monitor and record events occurring in the user's environment.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Generally, embodiments described herein can monitor conversations and/or events in a user's environment while the user is isolated and provide a log of events that happened while the user was isolated. FIG. 1 illustrates an exemplary environment in which a user 102 is working at a desk 104 while wearing noise-cancelling or noise-attenuating headphones 100. The headphones 100 can enable the user 102 to work without being distracted or disturbed by noises in his environment. For example, the noise-cancelling or noise-attenuating headphones 100 may block or attenuate the sound 108 from a ringing telephone 106 or a conversation 114 between two nearby people 110 and 112. Other examples of noises that may be blocked include a knock on the door or a ringing door bell ringing.

Generally, the headphones 100 can monitor the sounds and/or conversations occurring in the user's proximate physical environment while the user 102 is wearing the headphones 100 and can capture audio data corresponding to the sounds and/or conversations. The headphones 100 could also capture video of events occurring in the user's 102 surroundings while the user is wearing the headphones 100. The headphones 100 could then create a log of events that transpired while the user 102 was wearing the headphones 100, so that the user 102 can review the events log when he is done with his work. To create the event log, the headphones 100 can analyze the captured audio and/or video/image data to determine a context for the events. For example, the headphones 100 can analyze sounds detected in audio data to identify them (e.g., a ringing telephone). As another example, the headphones 100 can analyze voices in audio data or faces in video and/or image data to identify the person(s). As yet another example, the headphones 100 can analyze voices in audio data to identify spoken words. As yet another example, the headphones can analyze captured video and/or image data to identify objects and/or symbols in the environment. The headphones can populate the events log with determined context from the analyzed audio, image, and video data. For example, the scene shown in FIG. 1 illustrates two events: the telephone rings and two people have a conversation. The headphones can analyze captured audio data to determine that the first sound is a telephone ringing. The headphones can then create an entry for the events log with context. For example, the events log entry can be created to say "the telephone rang." The headphones 100 can also analyze captured audio, image, and/or video data to recognize the faces of the two people having the conversation. For example, the headphones 100 may employ facial recognition against a database of the user's acquaintances to determine that the two people are Doug and Steve. The headphones may also analyze Doug and Steve's spoken words to determine a topic of the conversation. As a result of the analysis, the headphones 100 can create an entry in the events log with context. For example, rather than saying "two people had a conversation," the entry with context may say "Doug and Steve had a conversation about the alpha project." In various embodiments, the headphones 100 can enable the user 102 to replay the audio associated with each event to hear exactly what was said (e.g., audio data captured from the conversation 114 using one or more microphone devices in the headphones 100). Doing so allows the user 102 to avoid interruptions from the events while still maintaining an awareness of the events that transpired.

Figure 2A:
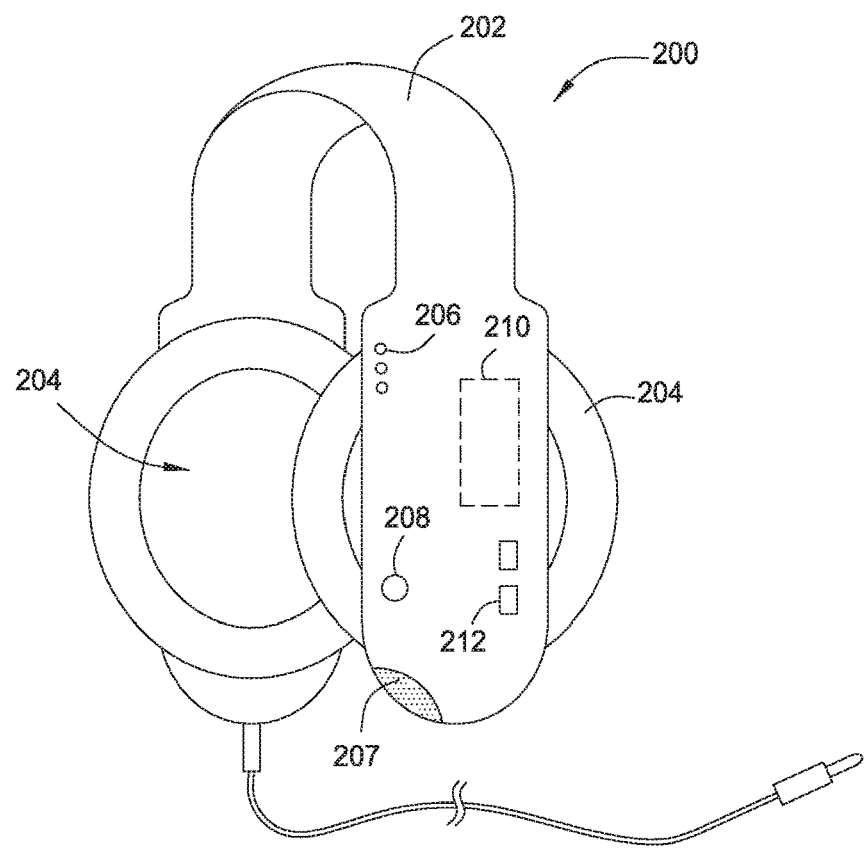
FIG. 2A is a perspective view of an embodiment of a pair of headphones wherein the headphones monitor and record events occurring in the user's environment.

Referring now to FIG. 2A, embodiments of noise-cancelling or noise-attenuating headphones 200 can include a housing 202 with speakers 204 that can be arranged over a user's ears. In various other embodiments, the speakers 204 can be arranged on the user's ears and/or in the user's ear canals (e.g., ear buds). In various other embodiments, the speakers 204 can be arranged in wireless (e.g., BLU-ETOOTH® wireless) headphones and/or in a hearing aid. The speakers 204 can be used to provide audio playback to the user. A system for monitoring events in a user's environment can be arranged on and/or in the housing 202. For instance, the system can include a microphone 206 arranged relative to the housing 202 that can detect sounds in the user's environment. Audio data captured by the microphone 206 can be transcribed and/or recorded for later review by the user. Audio data captured by the microphone 206 can also be analyzed to provide the user with a synopsis of events that occurred around him. The system could also include a digital camera or digital imager 208 arranged relative to the housing that can detect images (e.g., a single image, a video comprising a plurality of frames, etc.) in the user's environment. Video image data captured by the digital camera or digital imager 208 can be recorded for later review by the user. Video image data captured by the digital camera or digital imager 208 can also be analyzed to provide the user with a synopsis of events that occurred around him. Additionally, the system can include a speaker 207 arranged relative to the housing for communicating with people in the user's environment. Embodiments of the system can include user controls 212 that can enable a user to control modes of operation of the headphones 200 (discussed in greater detail below). The controls 212 can include one or more status lights that indicate a mode of operation of the headphones 200. In various embodiments, the headphones 200 can include a contact sensor 236 (see FIG. 2B) that can detect (and communicate to the processor module 210) when a user puts the headphones 200 on. For example, the contact sensor can include a pressure sensor that is actuated when the user places the headphones 200 on his head. As another example, the contact sensor can include an electrical circuit that is closed when in contact with skin. As another example, the contact sensor may include a temperature sensor that can detect skin temperature and/or a heartbeat sensor that can detect electrical signals that regulate heart beats. In the event the contact sensor is detecting temperatures within a typical range for a human and/or electrical signals consistent with a human heart beat, then the processor module 210, receiving the detected temperatures and/or electrical signals, can determine that the headphones 200 are currently being worn. In various embodiments, the contact sensor 236 can comprise a user-selectable switch.

Figure 2B:
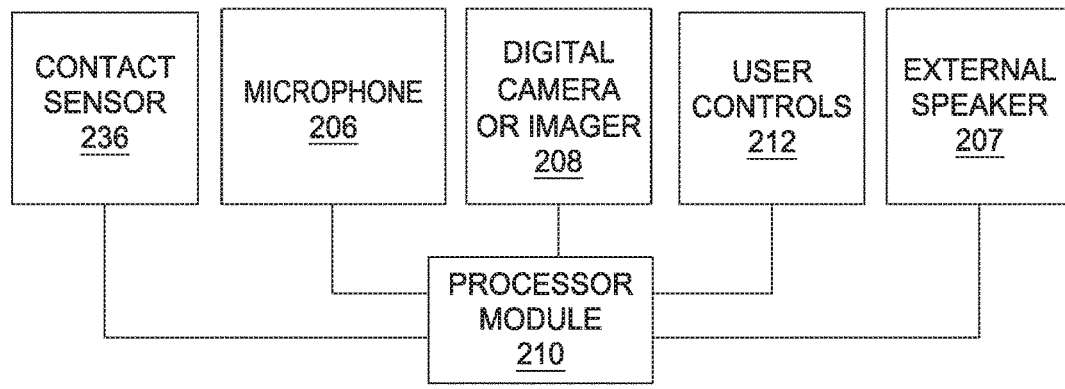
FIG. 2B is a schematic diagram of components in the headphones of FIG. 2A that monitor and record events occurring in the user's environment.
Figure 2C:
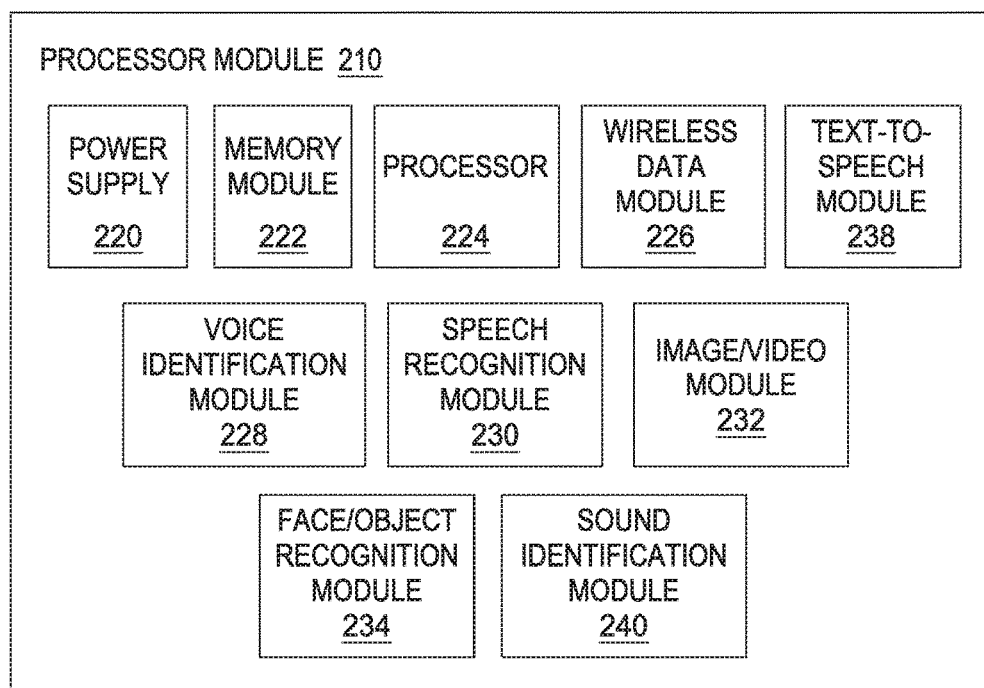
FIG. 2C is a schematic diagram of an embodiment of the processor module component of FIG. 2B.

Referring now to FIGS. 2B and 2C, the microphone 206, digital camera or digital imager 208, user controls 212, external speaker 207, and contact sensor 236 can be arranged in communication with a processor module 210. The processor module 210 can include a power supply 220 (e.g., a battery), a processor 224, and a memory module 222. In various embodiments, the memory 222 can include a built-in storage medium (e.g., a solid state hard drive). In various other embodiments, the memory 222 can include a removable storage medium (e.g., an SD memory card). The memory module 222 can store recordings of events detected by the microphone 206 and the digital camera or digital imager 208. The memory module 222 can also store a log of events created by the processor 224. In addition, various embodiments of the memory module 222 can include one or more databases used by the processor 224 to identify people, sounds, and objects in the user's environment. For example, the memory module 222 can include a voice database that contains recordings and/or profiles of different peoples' voices. For example, the voice database can include recordings and/or profiles for voices of acquaintances (e.g., family members, friends, and colleagues) of the user. A voice identification module 228 can work in combination with the voice database in the memory module 222 to identify voices detected by the microphone 206. For example, referring again to the exemplary environment depicted in FIG. 1, the user's colleagues Doug 110 and Steve 112 may be holding a conversation behind the user 100. The microphone 206 of the headphones 200 can detect voice profiles of Doug 110 and Steve 112 and the voice identification module 228 can match the detected voice profiles to respective profiles stored in the voice database associated with "Doug" and "Steve" and create a log entry stating: "11:00 AM Doug and Steve were nearby."

In various embodiments, the memory module 222 can also include a facial database that includes information related to faces of acquaintances of the user. A facial recognition module 234 can compare faces detected in the user's environment by the digital camera or digital imager 208 to faces in the facial database to determine whether acquaintances of the user were present in the user's environment. Referring again to the exemplary environment depicted in FIG. 1, the digital camera or digital imager 208 in the headphones 200 can detect images of Doug's 110 and Steve's 112 faces and compare the detected images to the information in the facial database and create a log entry stating: "10:30 AM—Steve and Doug spoke for 15 minutes."

In various embodiments, the processor module 210 can also include a speech recognition module 230 that can transcribe human speech into text. In such embodiments, the processor module 210 can provide an event log that includes context of conversations between people in the user's environment. Referring again to the exemplary environment depicted in FIG. 1, the microphone 208 can detect the conversation 114 between Doug 110 and Steve 112. An audio recording of the conversation can be stored on the memory module 222. In addition, the speech recognition module 230 can transcribe the audio recording (or audio captured by the microphone) into a text file. Furthermore, the speech recognition module 230 can analyze the transcribed text of the conversation to identify key words that may provide clues for the context of the conversation. For example, in their conversation, Doug 110 and Steve 112 may repeat the phrase "the alpha project" several times. The speech recognition module 230 and/or the processor 224 may determine from the repeated use of "the alpha project" that the topic of Doug's 110 and Steve's 112 conversation 114 was the alpha project. As another example, when Doug 110 and Steve 112 first meet, Doug 110 may say "Hey Steve, I need to talk to you about the alpha project." Here, the speech recognition module 230 and/or the processor 224 may determine from the opening statement of the conversation 114 that Doug 110 and Steve 112 are talking about the alpha project. In either example, the processor 224 can create a log entry stating: "10:30 AM—Doug and Steve talked about the alpha project." In various embodiments, the speech recognition module 230 can also detect tone and/or other non-language cues (e.g., laughter or hesitation) to determine a tone of a conversation. The speech recognition module 230 may use vocal analysis software (e.g., Beyond Verbal or EMOSpeech software) or the like to detect tone in a speaker's voice, for example. For example, such vocal analysis software may use frequency information, harmonic information, speech rate, and other factors in speech to determine an emotional state or the like of a speaker. For example, if Doug 110 and Steve 112 spoke in stern tones, the processor 224 may create a log entry stating: "10:30 AM—Doug and Steve had a tense conversation about the alpha project." By contrast, if Doug 110 and Steve 112 were laughing throughout the conversation, the processor 224 may create a log entry stating: "10:30 AM—Doug and Steve had a relaxed conversation about the alpha project."

Various embodiments of the memory module 222 can include a sound database that includes recordings and/or profiles of commonly-heard sounds (e.g., a knock on the door, a door bell ringing, and an emergency siren). The processor 224 can compare sounds detected to sounds in the sound database to identify them for the event log. For example, referring again to the exemplary environment depicted in FIG. 1, the microphone 206 may hear the telephone 106 ringing 108. The processor 224 can match the detected ringing 108 sound with a sound in the sound database. The processor 224 can then create an event log entry stating: "9:00 AM—telephone rang."

In various embodiments, the memory module 222 can also include an object/symbol database. An image/video module 232 can compare objects in the user's environment to objects and symbols in the objects/symbols database to identify certain objects or symbols in the user's environment. For example, if a UPS® delivery person stops by the user's office space, the image/video module 232 may match the UPS® emblem on the delivery person's uniform with the same emblem in the objects/symbols database to identify the delivery company for the events log. For example, the events log may include an entry stating: "9:30 AM—UPS delivery."

As described above, the memory module 222 can store recordings of audio and/or video events that occur in a user's 100 environment and also a log of the audio and/or video events (i.e., an event log). In various embodiments, the memory module 222 can store the audio and/or video events and log and the user can recall the log and the stored audio/video from the memory module 222. In various other embodiments, the memory module 222 can act as a buffer, temporarily storing the audio/video of the events and the log until the audio/video of the events and the log can be downloaded to another storage device. For example, the processor module 210 can include a wireless data module 226 that can be coupled to another computer device, such as a user's smart phone or personal computer via a wireless data connection (e.g., a BLUETOOTH® data connection or Wi-Fi data connection). The processor 224 can continuously or periodically transfer the audio/video recordings and event log from the memory module 222 to the other computer device via the wireless data module 226. Additionally, in various embodiments, the databases described above can be stored on the other computer device and the various modules (e.g., the voice identification module 228, the speech recognition module 230, the face/object recognition module 234, and the image/video module 232) in the processor module 210 can access the databases via the wireless data module 226. In various other embodiments, the various modules (e.g., the voice identification module 228, the speech recognition module 230, the face/object recognition module 234, and the image/video module 232) can be located in a processing module of the other computing device and the processing module 224 can send detected voices, faces, objects, and the like to the various modules via the wireless data module 226.

Embodiments of the headphones 200 can include different operational modes, including an "on" mode, an "on-monitoring" mode, and a "play back" mode. In the "on" mode, the headphones 200 can be providing noise-cancellation and/or noise-attenuation for the user, but the headphones 200 are not monitoring the user's environment and/or creating a log of events that occur while the user is using the headphones.

In the "on-monitoring" mode, the headphones 200 can be providing noise-cancellation and/or noise-attenuation for the user and also monitoring events and creating an events log. In the "play back" mode, the headphones 200 can enable the user to review the log and/or to replay certain events. A user can switch modes using the user controls 212 on the headphones 200. The user controls 212 can include status lights that change colors depending on mode of operation. For example, a light (e.g., an LED light) can be illuminated green to indicate that the headphones 200 are in the "on" mode and can be illuminated red to indicate that the headphones 200 are in the "on-monitoring" mode. The light can provide confirmation to the user that the headphones are in the intended operating mode. The light can also provide an indication to other people in the user's environment how the user is using the headphones 200. In various embodiments, the headphones may default to the "on" mode (e.g., when a power supply is connected and/or when a power switch is moved to an "on" position). The system can then automatically switch to the "on-monitoring" mode when the contact sensor 236 detects that the user has placed the headphones 200 on his head.

Figure 5:
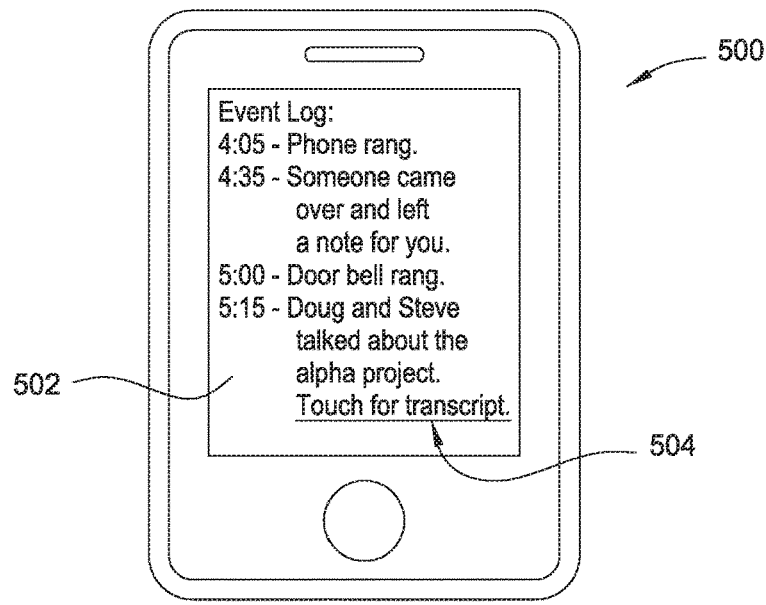
FIG. 5 illustrates an exemplary screen on a smart phone illustrating an event log created by embodiments of a system for monitoring and recording events.

Embodiments of the headphones 200 can include three formats for play back. Referring to FIG. 5, in a first format, the user can be presented with a text-based presentation of the event log. FIG. 5 illustrates an exemplary smart phone 500 of the user. The view screen 502 of the smart phone 500 can display the event log as a chronological list of events that were detected while the user was wearing the headphones 200. In various embodiments, some of the events in the log may include selectable links (e.g., hyperlinks) to audio and/or video of the event. For example, in FIG. 5, the event stating "Doug and Steve talked about the alpha project" can include a selectable link 504. If the user selects the link, then the audio and/or video of the link can be recalled from the memory module 222 and replayed for the user. For example, the user may hear the audio of Doug and Steve's conversation through the audio transducers 204 in the headphones 200. A video may be played on the view screen 502 of the smart phone 500. The video can also be played back on a wearable view screen (e.g., GOOGLE GLASS® eye glasses) or on a computer screen. In one embodiment, the audio and/or video data for Doug and Steve's conversation can be played back at an accelerated playback rate (e.g., two times regular speed), so that the user can more quickly review the events that transpired while the headphones were in the "on-monitoring" mode.

In a second format, the event log can be played back to the user in an audio format. For example, the processor module 210 can include a text to speech module 238 that can generate a spoken-language presentation of the event log. The spoken-language presentation can be played to the user via the audio transducers 204 in the headphones 200. If the user hears an event log entry about which he wants more information, then he can use the user controls 212 to select the entry. In response to the user control 212 input, the processor module 210 can access the audio and/or video recording associated with the log entry and replay it for the user.

In a third format, the headphones 200 can replay the recordings of events that happened in the user's environment. In various embodiments, the user can select the speed of replay using the user controls 212. For example, the headphones 200 can replay the recordings in real time or at increased speeds (e.g., two times regular speed or ten times regular speed). The headphones 200 can also replay the recordings at reduced speeds (e.g., half of regular speed). In this third format, the processor module 210 may skip portions of the event log in which nothing happens. For example, referring again to the exemplary environment depicted in FIG. 1 and the event log in FIG. 5 for reference, the user may use the headphones for a period of one-and-a-half hours between 4:00 PM and 5:30 PM. The headphones 200 may not detect any noises from 4:00 PM until the phone rings at 4:05 PM. Then, the headphones 200 may not detect any additional noises until 5:00 PM when the door bell rings. Then, the headphones 200 may not detect any noises until Doug and Steve have their conversation at 5:15 PM. In the above scenario, during replay, the processor may eliminate the long segments of silence between events so that the user listening to the replay would hear the sound of the phone ringing followed shortly thereafter by the sound of the door bell ringing and followed shortly thereafter by the audio recording of Doug and Steve's conversation.

In the various embodiments described above, the memory module 222 can include one or more databases to identify objects, symbols, and people in the user's environment. The objects and symbols database(s) can be pre-populated. For example, the memory module 222 can include an object and symbols database that includes logos, brand designs, and the like for popular products likely to show up in a user's environment. However, in various embodiments, the user has to provide inputs to the headphones 200 to identify the user's acquaintances. In various embodiments, the headphones 200 can query the user to identify the voices and/or faces of people who are detected in the user's environment. Referring again to the exemplary environment depicted in FIG. 1, if the user 100 is using the headphones 200 for the first time, the headphones may detect Doug 110 and Steve 112, but does not know who they are. The headphones 200 can generate a voice profile and/or a facial profile for Doug 110 and for Steve 112. Later, when the user reviews the events log, the user can be prompted to identify Doug and Steve. For example, the headphones 200 can play a recording of Doug's voice and/or show a picture of Doug's 110 face and prompt the user to provide an identity (e.g., a name) to associate with the profiled voice and/or face. The user may input the identity information using the user controls 212. The user may also input the identity information using controls on a smart phone (e.g., smart phone 500) or other computer to which the headphones are connected via wireless data module 226. The user may also input the identity information using the microphone 206 of the headphones (e.g., the user can state the name "Doug" in response to the prompt from the headphones 200). The headphones 200 can similarly prompt the user to identify Steve 112. Thereafter, when the headphones 200 detect Doug's 110 or Steve's 112 voice and/or face, the system can provide their identities in the event log.

In various embodiments, the one or more databases can be stored remotely (e.g., on a secure remote server). The headphones 200 can access the remotely-stored database (e.g., via a wired or wireless data connection) to compare recorded voices, sounds, and/or images to information in the database. In various instances, computer processing to associate recorded voices, noises, and/or images with information in the database can be provided remotely as well. For example, a cloud computing environment can be used to store the one or more database and to receive the recorded voices, sounds, and/or images. The cloud computing environment can then perform the analysis to match the recorded voices, sounds, and/or images with information in the database. Results of the analysis can then be returned from the cloud computing environment to the headphones 200.

In various embodiments, the headphones 200 can automatically query people in the user's environment for their identities. Referring to FIGS. 2A and 2B, the headphones 200 can include an external speaker 207. When an unidentified person is detected in the user's environment, the headphones 200 can play an audio message through the speaker 207, asking the unidentified person to identify himself. For example, referring to the exemplary environment depicted in FIG. 1, the headphones 200 may not recognize Doug 110. The headphones 200 can play a message through the external speaker 207, asking Doug 110 to identify himself. If Doug 110 states his name, then the microphone 206 can record Doug's name and the processing module 210 can generate a text-based entry for Doug's 110 identity (e.g., the speech recognition module 230 can analyze the recording of Doug 110 stating his name and transcribe the recorded name into text). If Doug 110 does not respond to the request, then the headphones 200 can revert to prompting to user to identify Doug 110 when the user reviews the event log.

Figure 3A:
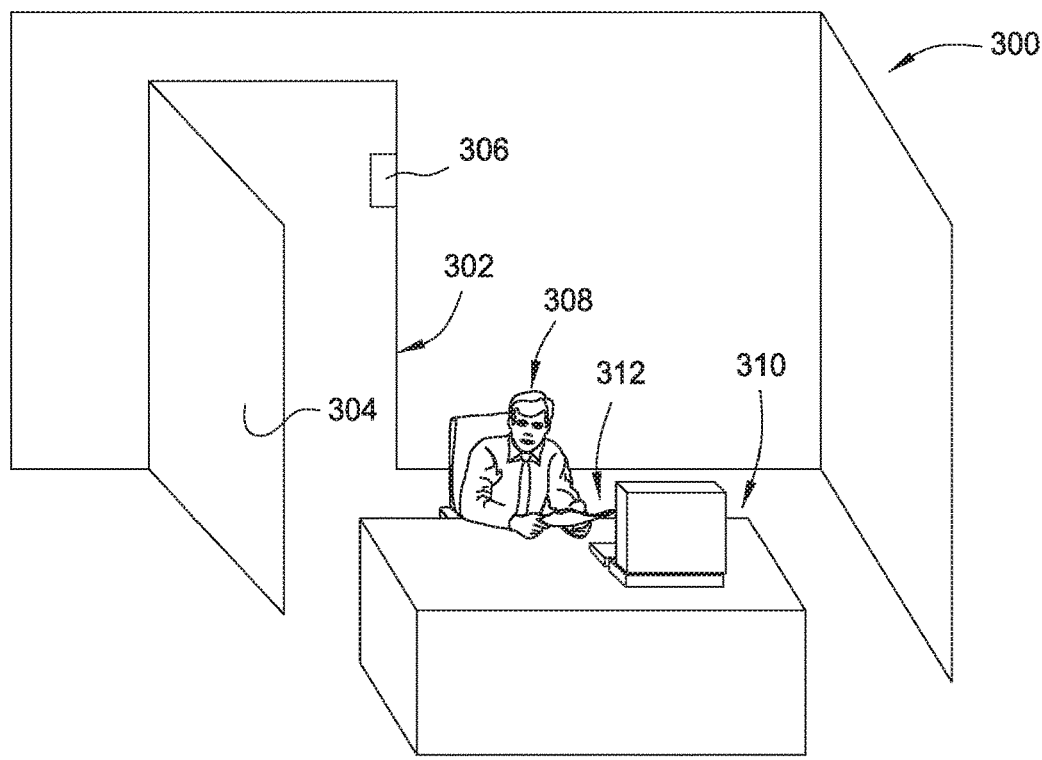
FIG. 3A is a perspective view of an office with a door, wherein an embodiment of an apparatus for monitoring and recording events is arranged in the doorway.
Figure 3B:
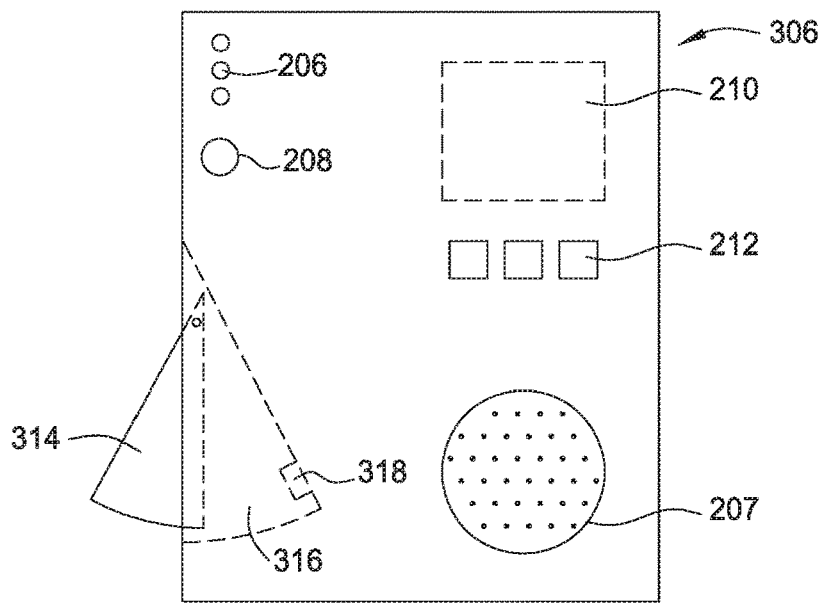
FIG. 3B is a schematic diagram of the apparatus of FIG. 3A.
Figure 3C:
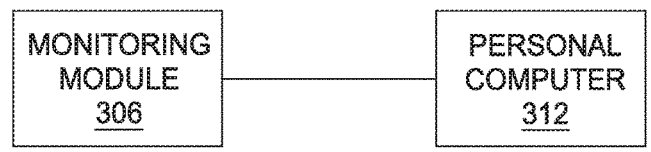
FIG. 3C is a schematic diagram of the apparatus of FIG. 3A is direct communication with the office occupant's computer.
Figure 3D:
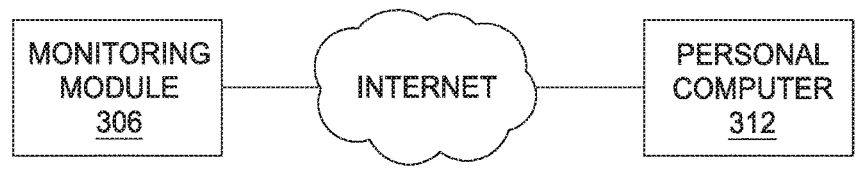
FIG. 3D is a schematic diagram of the apparatus of FIG. 3A in communication with the office occupant's computer via an Internet connection.

Referring now to FIGS. 3A-3D, embodiments of a system for monitoring a user's environment and providing a log of events can be implemented in an office setting in which a user 308 has an office 300 with a door 304. The system includes a monitoring module 306 that can be attached to or arranged on a door frame 302. Referring to FIG. 3B, the monitoring module 306 can include similar components as the headphones 200 discussed above with reference to FIGS. 2A-2C. For example, embodiments of the monitoring module 306 can include a microphone 206, digital camera or digital imager 208, external speaker 207, processing module 210, and user controls. The monitoring module 306 can also include a rocker 314 that can extend from the monitoring module 306. When the door 304 is closed, the door 304 can push the rocker 314 into a recess 316 in which the rocker 314 can depress a switch or button 318. When the door 304 is closed (and the button 318 is depressed), the monitoring module 306 can automatically switch to the "on-monitoring" mode to monitor events outside the user's 308 door 304. Recordings of events and event logs created by the monitoring module 306 can be transmitted to the user's 308 computer 312, smart phone, or the like. Referring to FIG. 3C, in various embodiments, the monitoring module 306 can be directly connected to the user's 308 computer 312 via a wired or wireless connection. For example, the monitoring module 306 may be connected to the user's 308 computer 312 via a BLUETOOTH® wireless connection. Referring to FIG. 3D, in various embodiments, the monitoring module 306 can be connected to the user's 308 computer 312 via an Internet connection. For example, the monitoring module 306 may send the recordings and event log to the user's computer in an electronic mail (e-mail) message or via a file transfer protocol (e.g., FTP).

In various embodiments, the monitoring module 306 can transmit the recordings of events and the events log to the user's 308 computer 312 when the user opens the door again. In various other embodiments, the monitoring module 306 can continuously transmit recordings of new events and associated event log entries to the user's 308 computer 312.

Figure 4:
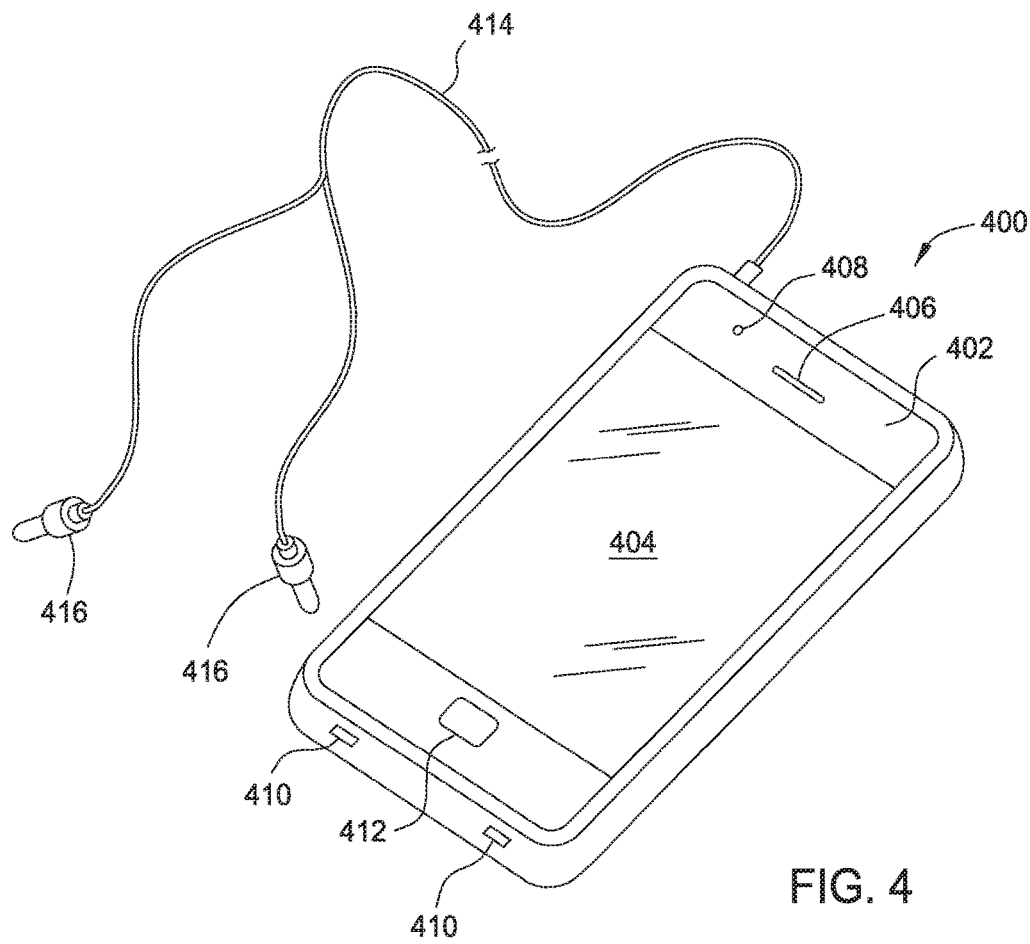
FIG. 4 is a perspective view of a smart phone, wherein an embodiment of a system for monitoring and recording events occurring in the user's environment is implemented in software on the smart phone.

Referring now to FIG. 4, embodiments of a system for monitoring a user's environment and providing a recording of events and an event log can be provided in software on a computer device, such as a user's smart phone 400. The software can run on the smart phone as an application and use the smart phone's 400 hardware and other software applications to monitor and record the user's environment while the user is wearing noise-cancelling or noise-attenuating headphones, such as ear buds 416. For example, the application can use a microphone 410 and digital camera or digital imager 408 built into the smart phone 400 to detect sounds and images, respectively, in the user's environment. Recordings of the detected sounds and/or images and a compiled event log can be stored in memory of the smart phone 400. The event log can be viewed on a view screen 404 of the smart phone. Recorded video can also be viewed on the view screen 404. Recorded audio can be listened to via the ear buds 416 or another speaker 406 on the smart phone 400.

In various embodiments, the system shown in FIG. 4 can work in cooperation with other smart phone applications to detect people in the user's environment. For example, the APPLE IPHONE® smart phone can run an application called "Find My Friends" that can track the location of acquaintances running the same application on their own phones. Embodiments of the system can monitor the reported locations of acquaintances (e.g., using tracking applications, such as the "Find My Friends" application) and include in the event log a report of acquaintances who pass close to the user. For example, a user may be studying in a coffee shop or college library and using an embodiment of the system on his smart phone. A friend of the user, Steve, also has a smart phone, and both the user's smart phone and the friend's phone are running a tracking application like "Find My Friends." If the friend enters the coffee shop or the library, the tracking application running on the user's smart phone can note the approach of the friend's smart phone. As a result, the system can include an entry in the event log such as "Steve was in the coffee shop at 12:30 PM."

Figure 6:
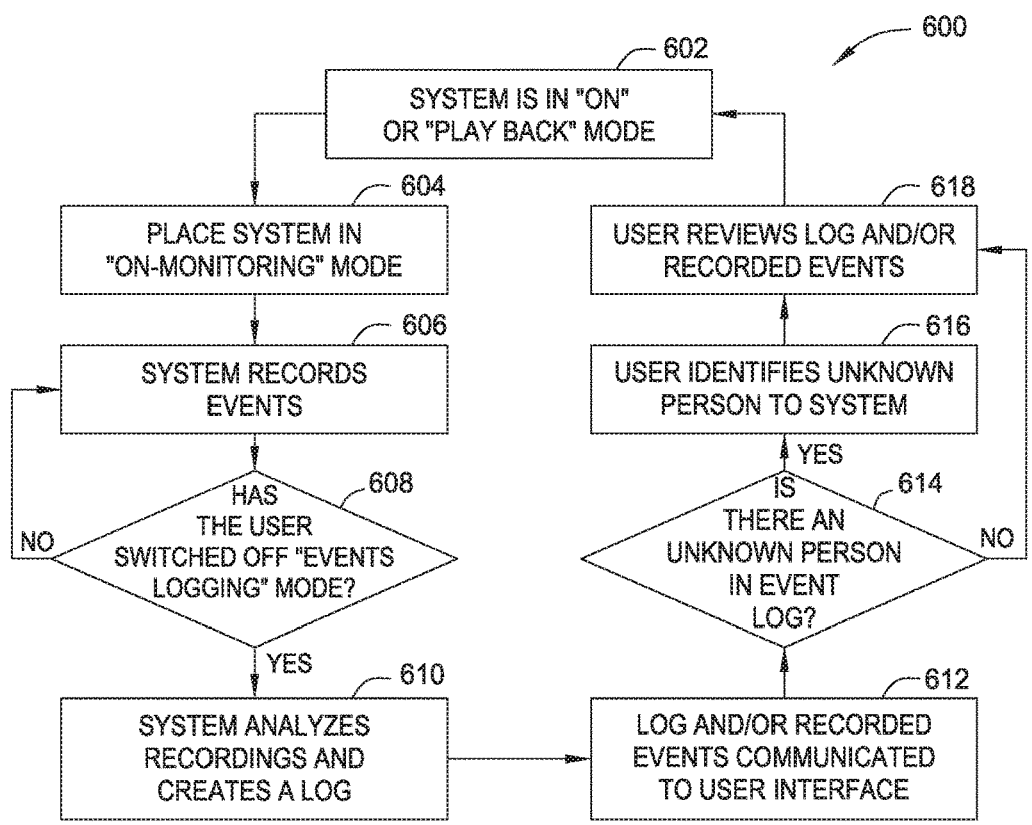
FIG. 6 is a flow chart that illustrates an embodiment of a method for implementing a system for monitoring and recording events and then providing an event log to a user.

Referring now to FIG. 6, steps for implementing a monitoring system 600 are shown. In block 602, the system is in "on" mode, in which the user is using noise-cancelling headphones or the like, but not using the system to monitor the user's surroundings, or in "play back" mode. In block 604, the user places the system in "on-monitoring" mode, in which the user is using the noise-cancelling or noise-attenuation feature and also using the system to monitor events. As discussed above, in certain embodiments, the user can place the system in the "on-monitoring" mode using the user controls. In certain other embodiments, a sensor, such as contact sensor 236 or button 318, can automatically place the system in the "on-monitoring" mode (e.g., when the user places headphones on his head or closes his office door). Once the system is placed in "on-monitoring" mode, in block 606, the system records events until, in block 608, the user has taken the device out of "on-monitoring" mode. For example, the user may use the user controls 212 to put the system back in "on" mode. As another example, the user may take off the headphones 200 or open the office door 304. After the system is taken out of "on-monitoring" mode, in block 610, the system analyzes the recording and creates an events log. For example, as described above, the system can compare detected sounds to sounds in a database to identify the detected sounds. Similarly, the system can analyze detected voices and/or faces to identify people in the user's environment. In various embodiments, the analysis step of block 610 can be performed simultaneously with the recording step of step 606 such that the event log is created during recording.

After the log has been created, in block 612, the log can be communicated to a user interface. Before the events log is displayed for the user, if the recordings and/or events log include a person, sound, and/or object that is unfamiliar to the system, in block 614, the system can query the user about the identity of the person, sound, and/or object. For example, the system can play a recording of the unknown person's voice or of the unknown sound. The system can also display an image of the unknown person's face or of the unknown object. In response to receiving the query, in block 616, the user can identify the unknown person, sound, and/or object. In block 618, after the event log has been created and unknown persons, sounds, and/or objects have been identified, the log can be communicated to the user. For example, the log can be displayed on a display screen of a computer, smart phone, or the like. The log can also be played for the user as an audio recording. The user can then select events in the log to listen to and/or view the recorded events associated with each log event.

As described above, the event log can include a list of events that occurred while the user was isolated. The event log can be displayed as text on a screen (e.g., a screen on the user's smart phone) or can be played as audio (e.g., through the speakers 204). The list of events in the event log can include text or graphics to identify specific aspects of events. For example, in embodiments that include a speech recognition module, the event log can include selected words recognized from human speech. As another example, in embodiments that include a voice recognition module, the event log can include identities of peoples whose voices are recognized from audio recordings. As another example, in embodiments that include a sound identification module 240, the event log can include identities of sounds that are recognizes from audio recordings. As another example, in embodiments that include a facial recognition module, the event log can include identities of people whose faces are recognized from image and/or video recordings. The identities can include a text presentation of a recognized person's name and/or an image of the person's face. As another example, in embodiments that include an object and/or symbol recognition module, the event log can include identities of objects and/or symbols from recorded image and/or video recordings. For example, the event log can specify a FedEx® delivery by including the text "FedEx Delivery" and/or by including an image of the FedEx® logo.

In various embodiments, detected activities can be selectively excluded from the event log, e.g. based on inputs from the user. For example, a user could provide particular key words for the system to listen for (or ignore) for use in filtering out particular events from the event log. For example, the user may be very interested in the alpha project, so the user can provide "alpha project" as key words or as a key phrase that the system can listen for. The system could then ensure that all events related to the alpha project are included in the event log. In one embodiment, the system is configured to consider such keywords as one of multiple factors in determining whether a particular event should be included in the event log. Moreover, while some factors (e.g., key words the user is interested in) describe events the user would like to be included in the event log (and thus make it more likely for an event satisfying those factors to appear in the event log), other inputs may describe events the user would like to be excluded from the event log. Continuing the previous example, the user may be working on the alpha project but many of his coworkers are working on the beta project. The user may input "beta project" as key words or as a key phrase that the system can ignore. Thus, events related to the beta project could be excluded from the event log, based on the user's indication that he is less interested in these events.

In various embodiments, a system can learn a user's preferences over time to selectively exclude detected activities from the event log. For example, a system may employ machine learning techniques in combination with a user's interaction with the event log to learn about the types of information that the user likes to see in the event log. For example, each listed event in an event log may include a selectable icon that the user can select to indicate that the particular activity noted in the log is important (i.e., an up-vote) and may include a selectable icon that the user can select to indicate that he does not want the particular activity noted in the log is not important (i.e., a down-vote). For example, the upvote and downvote icons may be "plus" and "minus" symbols, respectively. As another example, the upvote and downvote icons can be "thumbs up" and "thumbs down" symbols, respectively. In the above example in which a user is working on the alpha project and several co-workers are working on the beta project, a result log may include characterizations or summaries of conversations about the alpha project and characterizations or summaries of conversations about the beta project. By up-voting the items in the event log pertaining to the alpha project and down-voting the items in the event log pertaining to the beta project, the user can train the system to learn what he finds important for inclusion in the event log. In this example, future event logs may exclude conversations in the user's environment that discuss the beta project.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access other processing modules or new relevant events or continuous sounds (e.g., events or sounds added by other audio process modules) or related data available in the cloud.

While the preceding is directed to embodiments of the present disclosure, other and further embodiments of the disclosure may be devised without departing from the basic scope thereof, and the scope thereof is determined by the claims that follow.

What is claimed is:

1. Audio headphones for monitoring a physical environment in which the audio headphones are located, comprising:
    a housing;
    acoustic transducers that generate sound waves in ears of
        a subject wearing the audio headphones;
    a first sensor, arranged relative to the housing, that collects data from the physical environment;
    a memory module arranged relative to the housing; and
    a processor arranged relative to the housing and programmed to:
        analyze the collected data to identify one or more
            events that occurred within the physical environment, based on a comparison between the collected data and predefined event data corresponding to one or more known events; and generate an event log that includes at least an indication of the identified one or more events.

2. The audio headphones of claim 1, further comprising a second sensor, arranged relative to the housing, that provides an indication that a subject wearer is wearing the headphones, wherein the second sensor comprises a contact switch that provides the indication that the subject wearer is wearing the headphones when the contact switch is in contact with the head of the subject wearer.

3. The audio headphones of claim 1, wherein the first sensor comprises at least one of: a microphone and a digital imager.

4. The audio headphones of claim 1, wherein the processor comprises a speech recognition module programmed to recognize words in human speech, wherein the collected physical data includes an audio recording of human speech, and wherein the generated event log includes selected recognized words from the audio recording of human speech.

5. The audio headphones of claim 1, wherein the processor comprises a voice recognition module programmed to recognize human voices, wherein the collected physical data includes an audio recording of human voices, and wherein the generated event log includes identified recognized voices from the recording of human voices.

6. The audio headphones of claim 1, wherein the processor comprises a sound identification module programmed to recognize sounds, wherein the collected physical data includes an audio recording of sounds in the surroundings of an isolated user, and wherein the generated event log includes a description of recognized sounds from the audio recording of sounds.

7. The audio headphones of claim 1, wherein the processor comprises a facial recognition module programmed to recognize human faces, wherein the collected physical data includes a digital image recording of one or more human faces in the surroundings of an isolated user, and wherein the event log includes identities associated with identified faces from the digital image recording.

8. The audio headphones of claim 1, wherein the processor comprises an object recognition module programmed to recognize at least one of an object and a symbol, wherein the collected physical data includes a digital image recording of at least one of an object and a symbol in the surroundings of an isolated user, and wherein the event log includes an identity of the at least one of a recognized object and a recognized symbol from the digital image recording.

9. A non-transitory computer-readable medium including instructions that, when executed by a processor, cause the processor to provide monitoring services, by performing the steps of:

capturing, via one or more sensor devices, data of activity occurring within a physical environment, wherein the captured data comprises at least one of audio data, image data, and video data;

analyzing the captured data of the activity to identify a plurality of events that occurred within the physical environment;

determining, for at least one of the plurality of events, a context of the respective event;

determining, for each of the at least one of the plurality of events, a measure of importance of the respective event to a first user based on the respective context;

determining one or more events, from the at least one of the plurality of events, having a determined measure of importance that exceeds a predefined threshold of importance; and generating an event log that includes a respective characterization for each of the one or more events, wherein at least a first event of the plurality of events is excluded from the event log.

10. The computer program product of claim 9, wherein the program code that, when executed by a processor, performs a further operation comprising determining an event as a conversation based on detecting multiple human voices, and wherein an event log entry for the determined conversation event can comprise key words from the conversation.

11. The computer program product of claim 9, wherein the captured data of the activity indicates that a mobile device owned by an acquaintance of the first user is within the environment of the first user.

12. The non-transitory computer-readable medium of claim 9, wherein the context of the respective event comprises a keyword detected during the respective event.

13. The non-transitory computer-readable medium of claim 9, wherein the context of the respective event comprises a topic of a conversation detected during the respective event.

14. A method for monitoring a physical environment in which audio headphones are located, the method comprising:

capturing, via one or more sensor devices, data of activity occurring within a physical environment, wherein the captured data comprises at least one of audio data, image data, and video data;

analyzing the captured data of the activity to identify a plurality of events that occurred within the physical environment;

determining, for at least one of the plurality of events, a context of the respective event;

determining, for each of the at least one of the plurality of events, a measure of importance of the respective event to a first user based on the respective context;

determining one or more events, from the at least one of the plurality of events, having a determined measure of importance that exceeds a predefined threshold of importance; and generating an event log that includes a respective characterization for each of the one or more events, wherein at least a first event of the plurality of events is excluded from the event log.

15. The method of claim 14, further comprising determining an event as a conversation based on detecting multiple human voices, and wherein an event log entry for the determined conversation event can comprise key words from the conversation.

16. The method of claim 14, wherein the captured data of the activity indicates that a mobile device owned by an acquaintance of the first user is within the environment of the first user.

* * * * *